United States Patent
Uryu et al.

(10) Patent No.: US 10,486,736 B2
(45) Date of Patent: Nov. 26, 2019

(54) MOTOR CONTROL UNIT, ELECTRIC POWER STEERING APPARATUS EQUIPPED WITH THE SAME, AND VEHICLE

(71) Applicant: NSK LTD., Tokyo (JP)

(72) Inventors: Kyosho Uryu, Tokyo (JP); Shin Kumagai, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/306,775

(22) PCT Filed: May 23, 2017

(86) PCT No.: PCT/JP2017/019171
§ 371 (c)(1),
(2) Date: Dec. 3, 2018

(87) PCT Pub. No.: WO2017/212911
PCT Pub. Date: Dec. 14, 2017

(65) Prior Publication Data
US 2019/0308657 A1    Oct. 10, 2019

(30) Foreign Application Priority Data

Jun. 7, 2016  (JP) ................ 2016-113710
Jun. 7, 2016  (JP) ................ 2016-113711

(51) Int. Cl.
*B62D 5/04* (2006.01)
*H02P 25/22* (2006.01)
(Continued)

(52) U.S. Cl.
CPC .......... *B62D 5/046* (2013.01); *B62D 5/0406* (2013.01); *H02M 1/08* (2013.01);
(Continued)

(58) Field of Classification Search
CPC ........ B62D 5/046; B62D 5/0406; H02M 1/08
See application file for complete search history.

(56) References Cited

U.S. PATENT DOCUMENTS 8,878,474 B2    11/2014  Kezobo et al.
2007/0120520 A1    5/2007  Miyazaki et al.
(Continued)

FOREIGN PATENT DOCUMENTS

EP    2 552 005 A1    1/2013
JP    2007-151366 A    6/2007
(Continued)

OTHER PUBLICATIONS

International Search Report for PCT/JP2017/019171 dated Aug. 1, 2017 {PCT/ISA/210].

(Continued)

*Primary Examiner* — Michael D Lang
(74) *Attorney, Agent, or Firm* — Sughrue Mion, PLLC

(57) ABSTRACT

[Problem]
An object of the present invention is to provide a motor control unit that driving-controls a motor having the dual-system windings, even in a case that one driving control system is an abnormality (including a failure), turns-ON of one common reverse-connection protection-FET by a driving signal of the other normal driving control system, and achieves a miniaturization and a reduction in costs, an electric power steering apparatus that is equipped with the motor control unit, and a vehicle.
[Means for Solving the Problem]
The present invention is the motor control unit, comprising: an MCU to control the motor having dual-system motor windings, dual-system inverters to drive the respective dual-system motor windings via dual-system driving sections, and one reverse-connection protection-FET that is connected between the dual-system inverters and a power (Continued)

FIRST EMBODIMENT supply, wherein the reverse-connection protection-FET is turned-ON or turned-OFF by a logical sum of gate driving signals from the dual-system gate driving sections.

17 Claims, 19 Drawing Sheets

(51) Int. Cl.
*H02M 7/5387* (2007.01)
*H02M 1/08* (2006.01)
*H02P 29/024* (2016.01)
*H02P 27/08* (2006.01)

(52) U.S. Cl.
CPC ........ *H02M 7/53871* (2013.01); *H02P 25/22* (2013.01); *H02P 27/08* (2013.01); *H02P 29/024* (2013.01); *H02P 2201/09* (2013.01)

(56) References Cited

U.S. PATENT DOCUMENTS

| | | |
|---|---|---|
| 2011/0018374 A1 | 1/2011 | Yamasaki et al. |
| 2013/0200827 A1 | 8/2013 | Kezobo et al. |
| 2017/0297612 A1* | 10/2017 | Uryu .................... H02P 6/28 |
| 2019/0052218 A1 | 2/2019 | Sakashita |

FOREIGN PATENT DOCUMENTS

| | | |
|---|---|---|
| JP | 2009-274686 A | 11/2009 |
| JP | 4998836 B2 | 8/2012 |
| JP | 2013-162680 A | 8/2013 |
| JP | 2014-057514 A | 3/2014 |
| WO | 2017/150070 A1 | 9/2017 |

OTHER PUBLICATIONS

Written Opinion for PCT/JP2017/019171 dated Aug. 1, 2017 {PCT/ISA/237].

* cited by examiner

PRIOR ART

PRIOR ART

PRIOR ART

PRIOR ART

FIRST EMBODIMENT

SECOND EMBODIMENT

THIRD EMBODIMENT

FOURTH EMBODIMENT

FIFTH EMBODIMENT

SIXTH EMBODIMENT

SEVENTH EMBODIMENT

MOTOR CONTROL UNIT, ELECTRIC POWER STEERING APPARATUS EQUIPPED WITH THE SAME, AND VEHICLE

CROSS REFERENCE TO RELATED APPLICATIONS

This application is a National Stage of International Application No. PCT/JP2017/019171 filed May 23, 2017, claiming priority based on Japanese Patent Application Nos. 2016-113710 filed Jun. 7, 2016 and 2016-113711 filed Jun. 7, 2016.

TECHNICAL FIELD

The present invention relates to a motor control unit that driving-controls a motor having dual-system windings by one reverse-connection protection-field-effect transistor (FET) and dual-system driving control systems (a micro controller unit (MCU), a central processing unit (CPU), a micro processor unit (MPU), a microcomputer and the like) which are commonly connected to a power supply, in a case that one driving control system is an abnormality (including a failure), maintains turning-ON of the reverse-connection protection-FET by a driving signal of the other normal driving control system, and achieves a miniaturization and a reduction in costs, an electric power steering apparatus that is equipped with the motor control unit, and a vehicle.

BACKGROUND ART

An electric power steering apparatus (EPS) which is equipped with the motor control unit, and provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus (EPS) will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a pinion-and-rack mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (an electronic control unit (ECU)) 30 for controlling the electric power steering apparatus from a battery 13 as a power supply, and an ignition key signal is inputted into the control unit 30 through an ignition key 11. The control unit 30 calculates a current command value of an assist command (a steering assist command) on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value. A steering angle sensor 14 is not indispensable and may not be provided. It is possible to obtain the steering angle from a rotational position sensor which is connected to the motor 20.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a control section that includes an MCU (including an CPU and an MPU), and general functions performed by programs within the control section are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a current command value calculating section 31. The current command value calculating section 31 calculates a current command value Iref1 based on the steering torque Th and the vehicle speed Vel using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtraction result ΔI (=Irefm−Im) in the subtracting section 32B is proportional-integral-controlled (PI-controlled) at the PI-control section 35. The voltage control value Vref obtained by the current control is inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self-aligning torque (SAT) detected or estimated and an inertia compensation value 342 at an adding section 344. The addition result is further added with a convergence control value 341 at an adding section 345. The addition result is inputted into the adding section 32A as the compensation signal CM, thereby to improve the characteristics of the current command value Iref1.

In a case that the motor 20 is a three-phase brushless motor, details of the PWM-control section 36 and the inverter 37 have a configuration as shown in FIG. 3, and the PWM-control section 36 comprises a duty calculating section 36A that calculates the PWM duty values D1 to D6 which are used in a three-phase PWM-control by using the voltage control command value Vref in accordance with a predetermined equation, and a gate driving section 36B that drives gates of the FETs as the driving device by means of the PWM-duty values D1 to D6 and turns-ON or turns-OFF the gates of the FETs for compensating a dead time. The modulation signal (carrier) CF is inputted into the duty calculating section 36A, and the duty calculating section 36A calculates the PWM-duty values D1 to D6 by synchronized to the modulation signal CF. The inverter 37 is configured to the three-phase bridges of the FETs. The motor 20 is driven by turning-ON or turning-OFF the respective FETs by using the PWM-duty values D1 to D6.

A motor release switch 23 is interposed between the inverter 37 and the motor 20 in order to block a current supply when the assist control is stopped and the like. The motor release switch 23 comprises the FETs with parasitic diodes disposed to respective phases.

Recently, redundancy of the steering system is required, and the motor having multi-system motor windings is used to the motor for the assist-control. For example, FIG. 4 shows a star (Y)-connection of the three-phase motor. One system comprises a U-phase winding UW1, a V-phase winding VW1 and a W-phase winding WW1, and the other system comprises the U-phase winding UW2, the V-phase winding VW2 and the W-phase winding WW2. The motor is driven by passing the three-phase currents through the windings UW1 to WW1 or the windings UW2 to WW2. FIG. 5 shows a delta (Δ)-connection of the three-phase motor. One system comprises the U-phase winding UW1, the V-phase winding VW1 and the W-phase winding WW1, and the other system comprises the U-phase winding UW2, the V-phase winding VW2 and the W-phase winding WW2. The motor is driven by passing the three-phase currents through the windings UW1 to WW1 or the windings UW2 to WW2.

The motor 120 having such the multi-system windings (dual-system windings) is driving-controlled by, for example, the dual-system driving control systems (the MCU, the microcomputer and the like), as shown in FIG. 6.

That is, the overall control is performed by the MCU 100. The first system windings #1 of the motor 120 having the dual-system motor windings are driving-controlled by the inverter 121A through the motor release switch 122A, and the second system windings #2 are driving-controlled by the inverter 121B through the motor release switch 122B. The MCU 100 controls turning-ON or turning-OFF of the FET1A to the FET6A of the inverter 121A through the gate driving section 140, and controls turning-ON or turning-OFF of the FET1B to the FET6B of the inverter 121B through the gate driving section 140. The electric power is supplied from the battery 150 to the inverter 121A and the inverter 121B.

In such an electric power steering apparatus of the dual-system control, for example, as shown in Japanese Patent No.4998836 B2 (Patent Document 1), the reverse-connection protection-FETs are disposed to respective systems not to pass the overcurrent through the ECU and be burned out the ECU when the battery is reverse-connected. That is, in the Patent Document 1, the dual-system reverse-connection protection-FETs are disposed for the reverse-connection protection of the battery. In a case that the FET driving circuit (a pre-driver) in one system is failed, the dual-systems have a configuration that the reverse-connection protection-FETs and the inverter in the other system continue operating.

THE LIST OF PRIOR ART DOCUMENTS

Patent Documents

Patent Document 1: Japanese Patent No.4998836 B2

SUMMARY OF THE INVENTION

Problems to be Solved by the Invention

However, in the Patent Document 1, in a case that the FET driving circuit in one system is failed, the dual-systems have a configuration that the reverse-connection protection-FETs and the inverter in the other system continue operating. Since the two reverse-connection protection-FETs are needed, there is a problem that the costs increase.

The present invention has been developed in view of the above-described circumstances, and an object of the present invention is to provide the motor control unit that driving-controls the motor having the dual-system windings, even in a case that one driving control system is an abnormality (including a failure), turns-ON of one common reverse-connection protection-FET by the driving signal of the other normal driving control system, and achieves the miniaturization and a reduction in costs, the electric power steering apparatus that is equipped with the motor control unit, and the vehicle.

Means for Solving the Problems

The present invention relates to a motor control unit with a motor having dual-system motor windings, the above-described object of the present invention is achieved by that comprising: a micro controller unit (MCU) to control a motor having dual-system motor windings, dual-system inverters to drive the respective dual-system motor windings via dual-system driving sections, and one reverse-connection protection-field-effect transistor (FET) that is connected between the dual-system inverters and a power supply, wherein the reverse-connection protection-FET is turned-ON or turned-OFF by a logical sum of gate driving signals from the dual-system gate driving sections.

Further, the above-described object of the present invention is achieved by that comprising: an MCU to control a motor having dual-system motor windings, dual-system inverters to drive the respective dual-system motor windings via dual-system driving sections, and one reverse-connection protection-FET that is connected between the dual-system inverters and a power supply, and supplies electric power, wherein the reverse-connection protection-FET is turned-ON or turned-OFF by a logical sum of gate driving voltages from the dual-system gate driving sections.

The above-described object of the present invention is achieved by an electric power steering apparatus that is equipped with the motor control unit, driving-controls the motor by a current command value calculated based on at least a steering torque, and applies an assist torque to a steering system of a vehicle, or a vehicle that is equipped with the electric power steering apparatus.

Effects of the Invention

According to the motor control unit of the present invention, since the system has a configuration that the one reverse-connection protection-FET is commonly connected to the dual-system inverters, the miniaturization of the motor control unit and a reduction in costs can be achieved.

The electric power steering apparatus that is equipped with the motor control unit and has a high reliability can be provided, and the vehicle that is equipped with the electric power steering apparatus can also be provided.

MODE FOR CARRYING OUT THE INVENTION

Reverse-connection protection-FETs are not disposed to the respective inverters in the present invention, and only one reverse-connection protection-FET is commonly disposed to the inverters. The power supply that performs a logical sum (OR) of driving signals for driving the reverse-connection protection-FET which are generated from dual-system FET-gate driving sections is directly driven or is driven (turning-ON or turning-OFF) via an FET driving section. Thereby, in a case that one FET driving system of the dual-systems is an abnormality (including a failure) and the driving signal of the reverse-connection protection-FET cannot be outputted from one FET driving system, the reverse-connection protection-FET can be driven (turning-ON or turning-OFF) by the driving signal from the other system of the FET driving system. Thus, a miniaturization of the motor control unit and a reduction in costs can be achieved.

Embodiments of the present invention will be described with reference to drawings.

Figure 1:
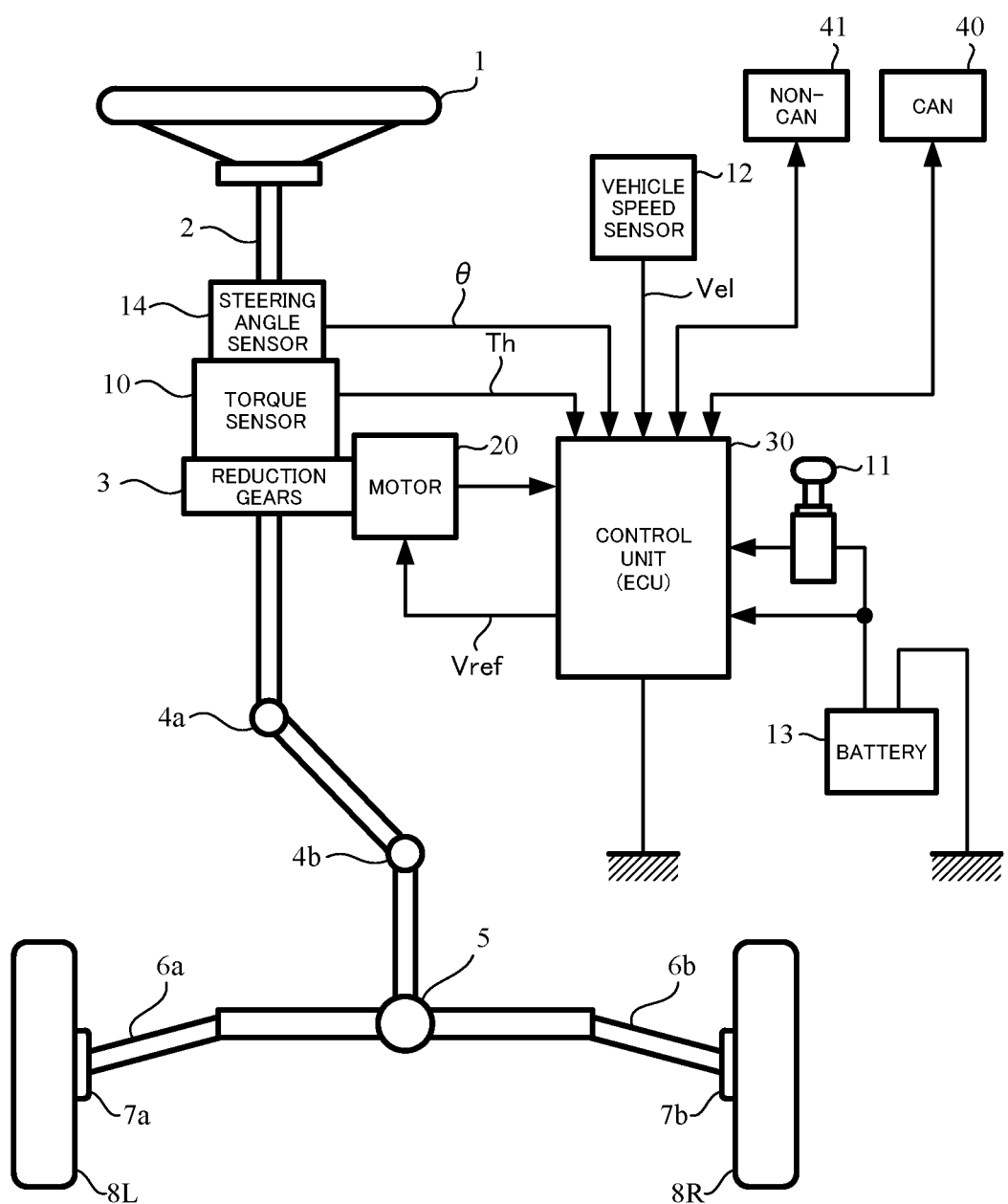
FIG. 1 is a configuration diagram showing a general outline of an electric power steering apparatus.
Figure 2:
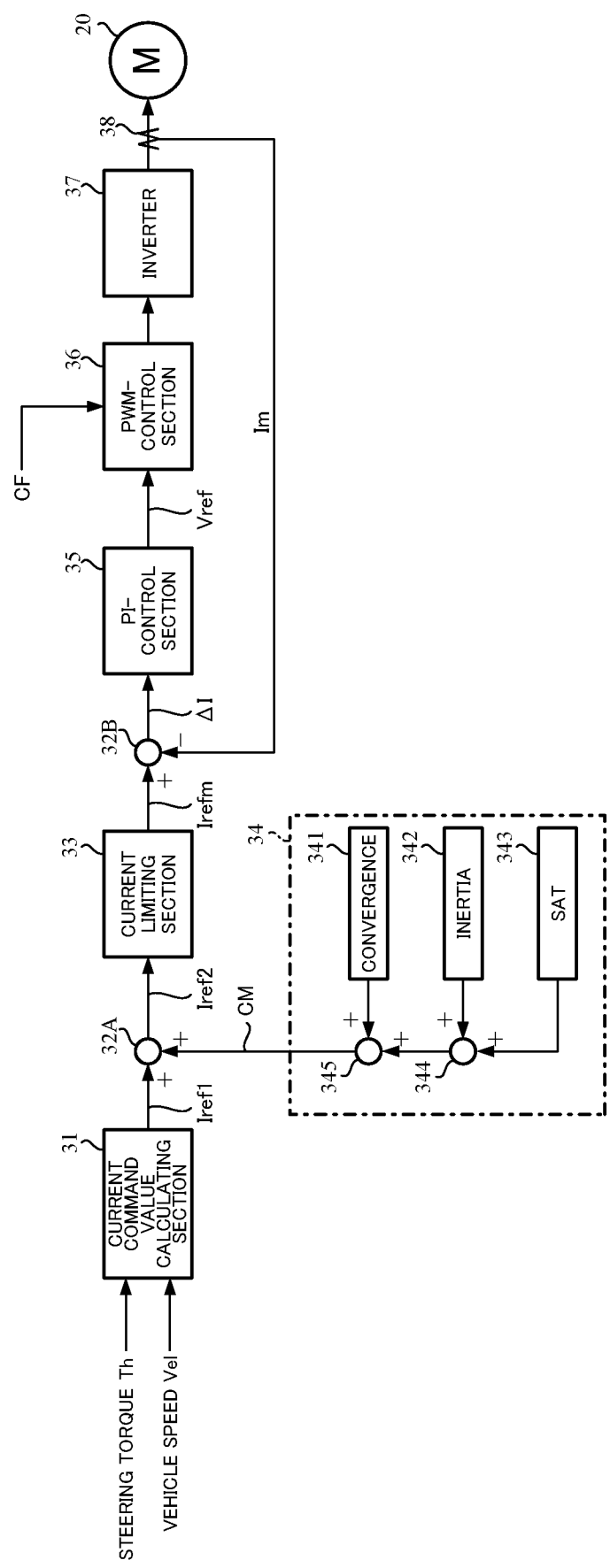
FIG. 2 is a block diagram showing a general configuration example of a control system of the electric power steering apparatus.
Figure 3:
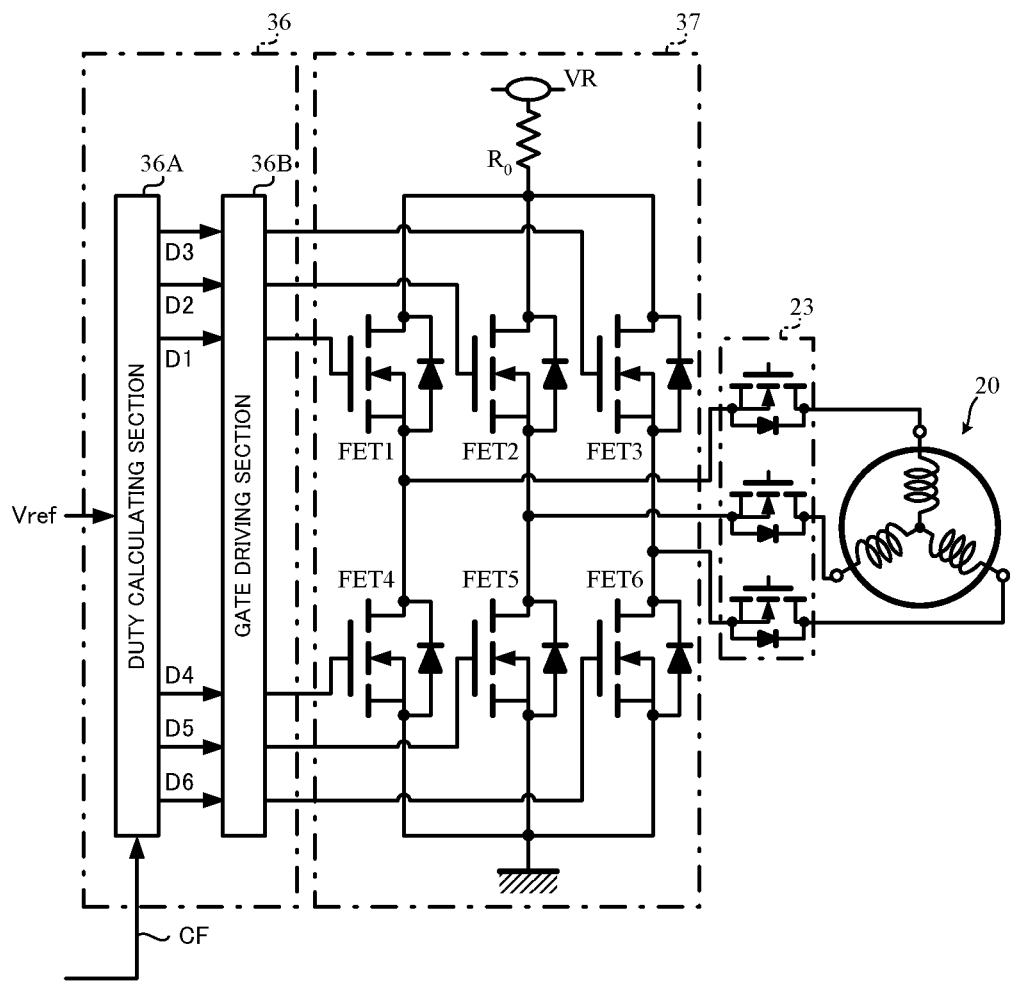
FIG. 3 is a circuit diagram showing a configuration example of a PWM-control section and an inverter.
Figure 4:
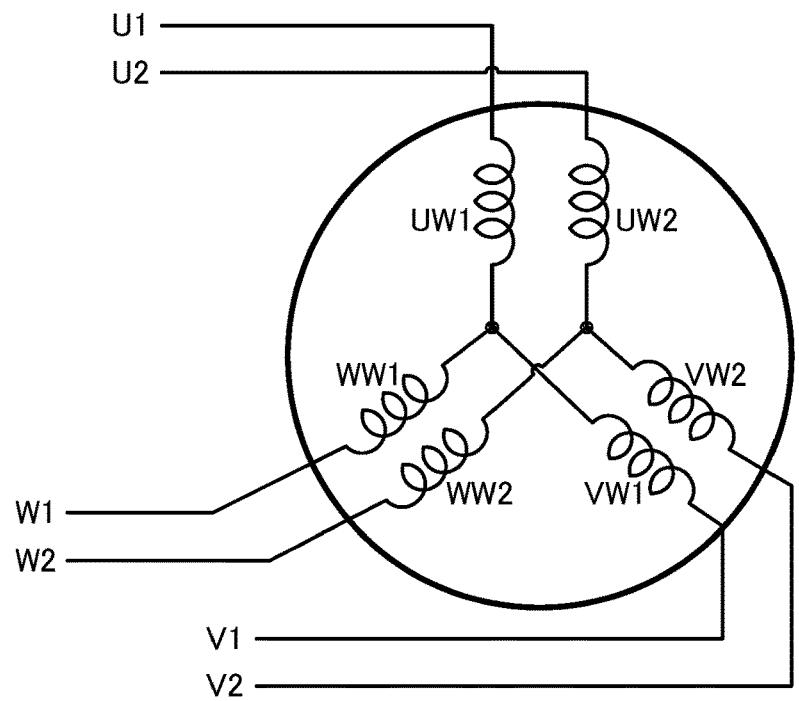
FIG. 4 is a schematic diagram showing a winding structure of a dual-system winding motor (a star connection)
Figure 5:
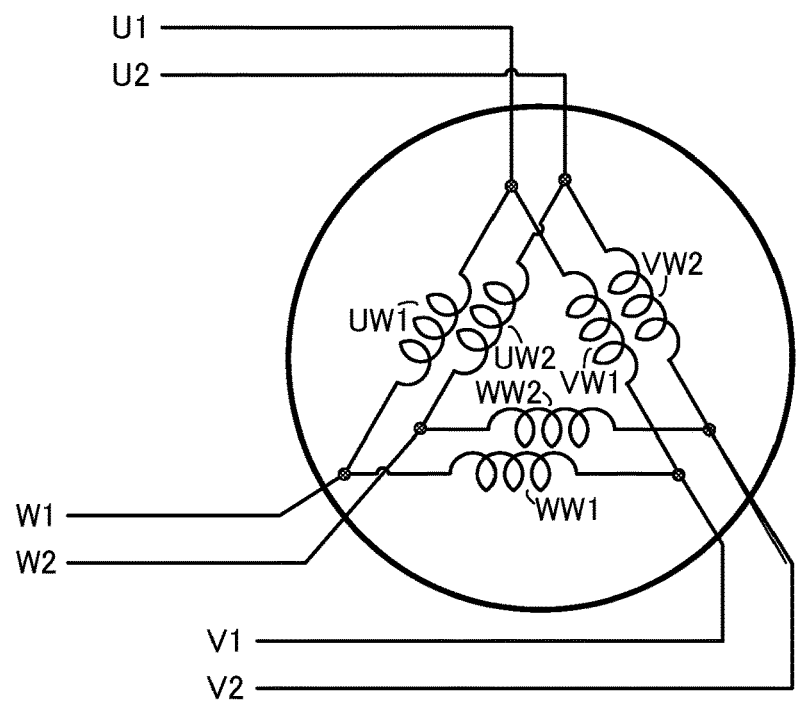
FIG. 5 is a schematic diagram showing the winding structure of the dual-system winding motor (a delta connection)
Figure 6:
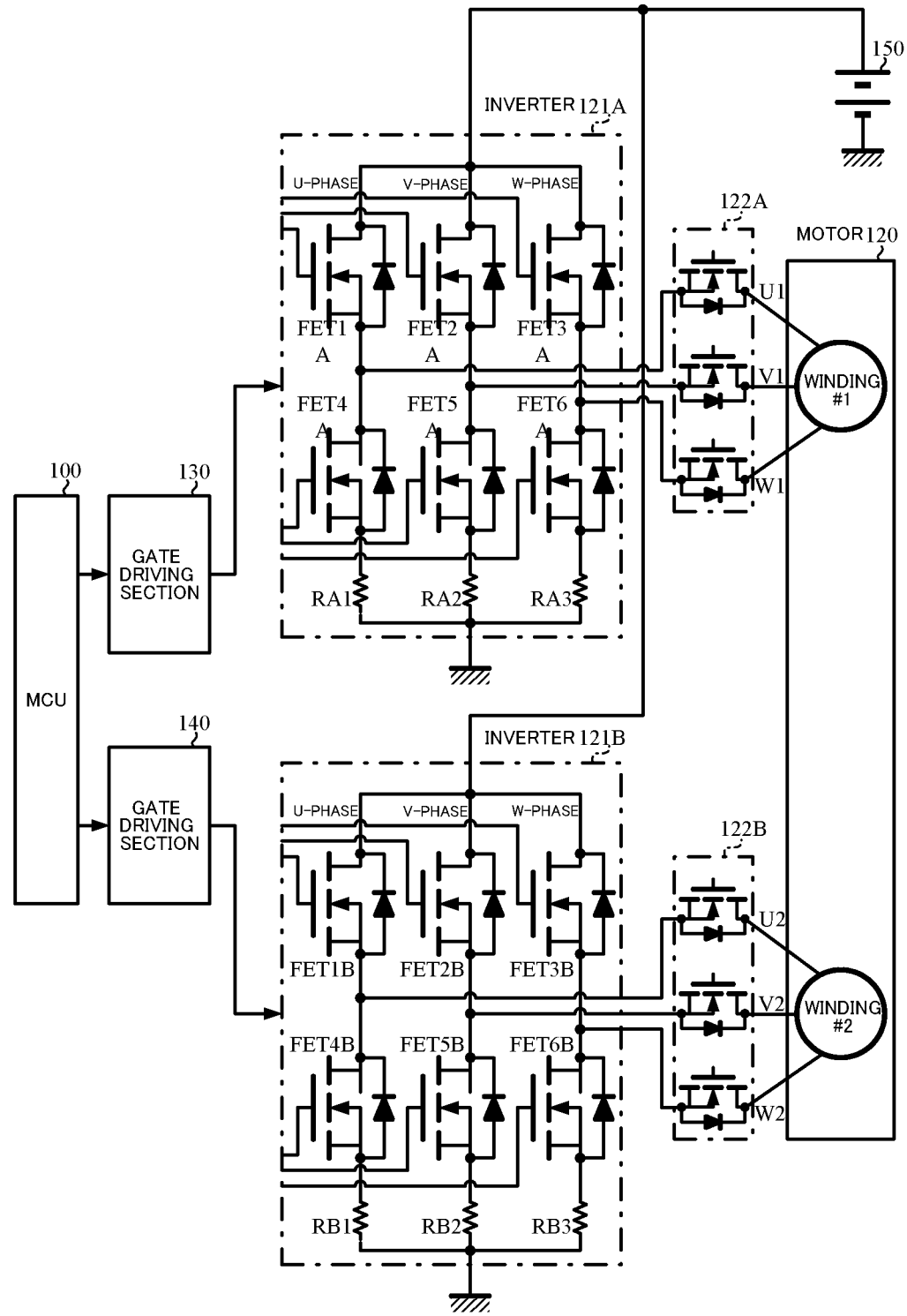
FIG. 6 is a circuit diagram showing one example of a driving control system of the dual-system winding motor.
Figure 7:
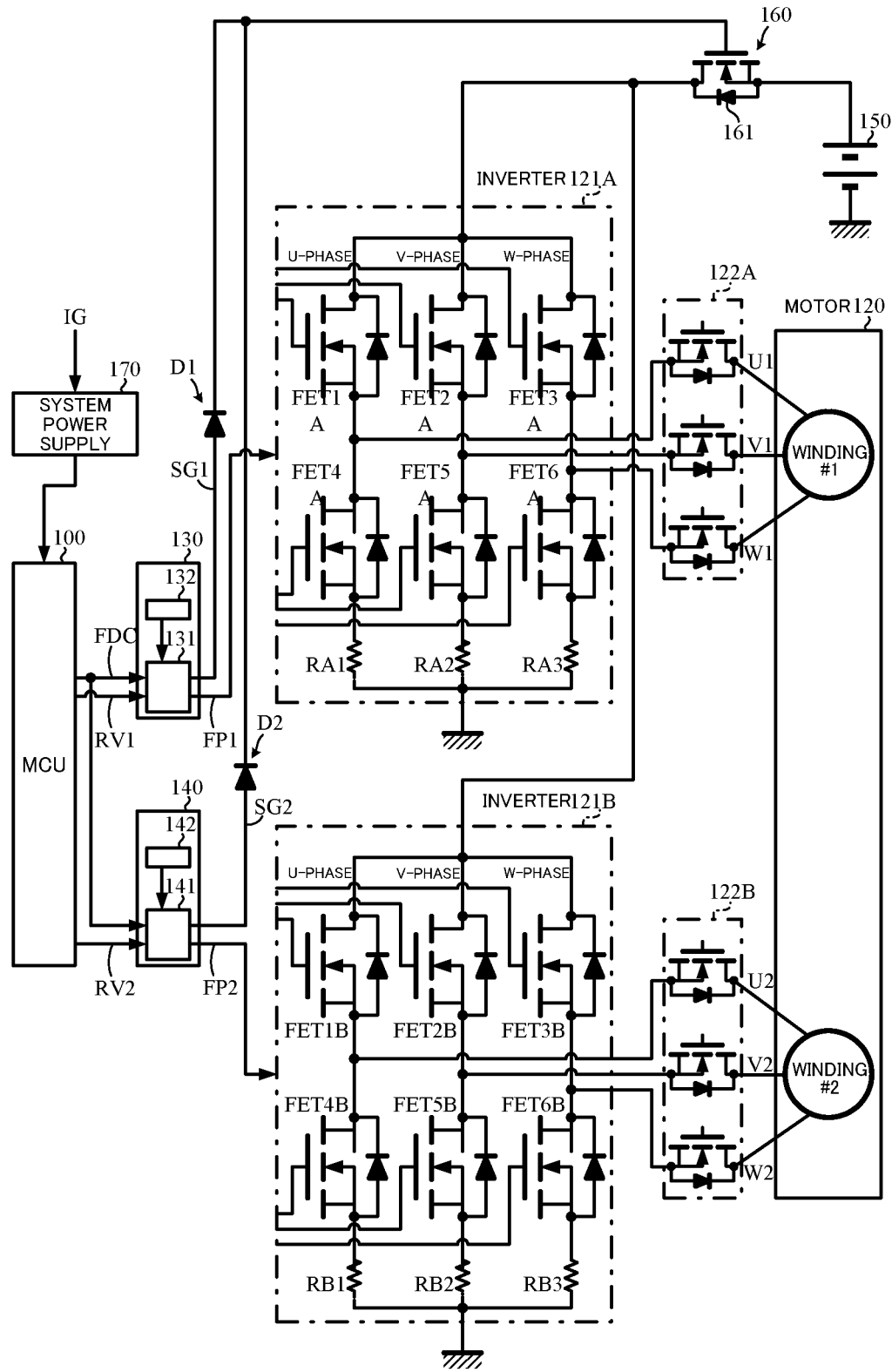
FIG. 7 is a circuit diagram showing a configuration example of the present invention (the first embodiment)

FIG. 7 shows the first embodiment of the present invention corresponding to FIG. 6. The common reverse-connection protection-FET 160 is connected between dual-system inverters 121A and 121B and the battery 150 being a power supply. When the reverse-connection protection-FET 160 is turned-OFF, electric power is supplied from the battery 150 to the inverters 121A and 121B through a parasitic diode 161. Driving signals SG1 and SG2 (for example, a charge pump voltage) are outputted from dual-system gate driving sections 130 and 140, respectively. The driving signals SG1 and SG2 passes through diodes D1 and D2, respectively, and performs a wired OR (a logical sum). The above signal is inputted into a gate of the reverse-connection protection-FET 160. A reverse-connection protection-FET driving command FDC from an MCU 100 is inputted into the gate driving sections 130 and 140. The gate driving sections 130 and 140 output the driving signals SG1 and SG2 based on the reverse-connection protection-FET driving command FDC.

The electric power is supplied from the system power supply 170 to the MCU 100, and the system power supply 170 is activated or is blocked by an ignition key signal IG.

Figure 8:
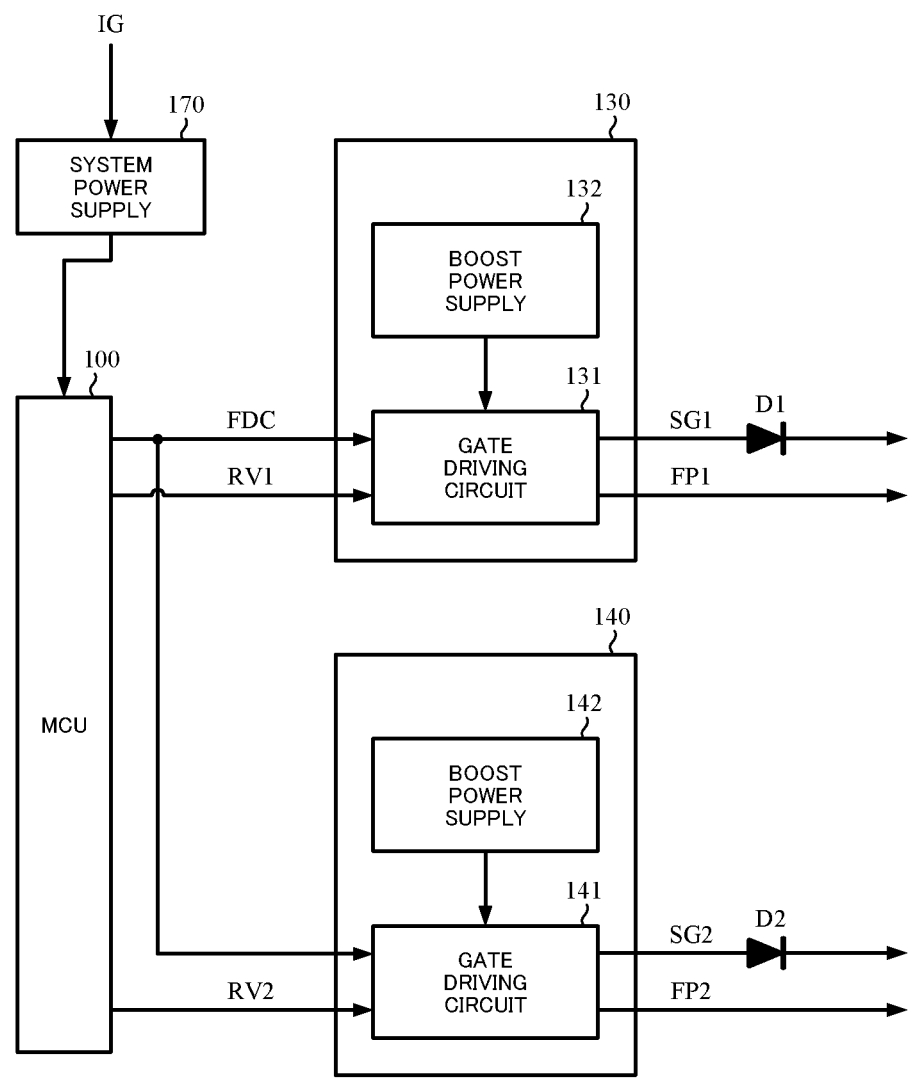
FIG. 8 is a block diagram showing a configuration example of a gate driving section (the first embodiment)

A configuration of the gate driving sections 130 and 140 is shown in, for example, FIG. 8. The gate driving sections 130 and 140 respectively comprise gate driving circuits 131 and 141 that the FETs of the inverters 121A and 121B are driven turning-ON or turning-OFF by duty command values RV1 and RV2 from the MCU 100, and boost power supplies 132 and 142 that supply the gate voltages to the gate driving circuits 131 and 141, respectively. The boost power supplies 132 and 142 are constituted by a step-up converter or a charge pump.

The gate driving circuits 131 and 141 input the reverse-connection protection-FET driving command FDC from the MCU 100, and output the driving signals SG1 and SG2, respectively.

In such a configuration, the reverse-connection protection-FET 160 is turned-ON or turned-OFF by the logical sum of the driving signals SG1 and SG2. The reverse-connection protection-FET 160 is operated as shown in a below Table 1.

TABLE 1

| Reverse-connection Protection-FET driving command (FDC) | Reverse-connection Protection-FET driving signal 1 (SG1) | Reverse-connection Protection-FET driving signal 2 (SG2) | Reverse-connection Protection-FET 160 |
| --- | --- | --- | --- |
| L (Normal) | L (Normal) | L (Normal) | OFF |
| H (Normal) | H (Normal) | H (Normal) | ON |
| H (Normal) | L (Abnormal) | H (Normal) | ON |
| H (Normal) | H (Normal) | L (Abnormal) | ON |

When the inverters 121A and 121B are driving-operated and the dual-system winding motor 120 is energized, the reverse-connection protection-FET is turned-OFF and the current is passed through a parasitic diode 161. In a case that the reverse-connection protection-FET is turned-OFF, since the current is passed through the parasitic diode 161 within the reverse-connection protection-FET 160, a loss of the reverse-connection protection-FET 160 is large, and the failure can be occurred by heat generation, regenerative electric power from the motor, and an excess of a withstand voltage between a drain and a source due to inductive load surge. Thus, when the inverters 121A and 121B are operated, the reverse-connection protection-FET 160 is turned-ON by the MCU 100 before starting to operate the inverters.

In operating the dual-system inverters 121A and 121B, even in a case that one system of the FET driving systems is abnormal and the driving signals SG1 and SG2 cannot be outputted, since the logical sum of the driving signals SG1 and SG2 is obtained, the inverters 121A and 121B can be operated in a state that the reverse-connection protection-FET 160 is turned-ON by using the driving signal from the other system of the FET driving systems.

By using the above configuration, even in a case that one system of the FET driving systems is abnormal and the FET driving signal cannot be outputted, the reverse-connection protection-FET 160 can be driven by the FET driving signal from the other system of the FET driving systems. Thereby, in a case that one system of the FET driving systems is abnormal and the motor 120 is driven by the FET driving system and the inverter of the other system, the reverse-connection protection-FET 160 can maintain the turned-ON.

Figure 9:
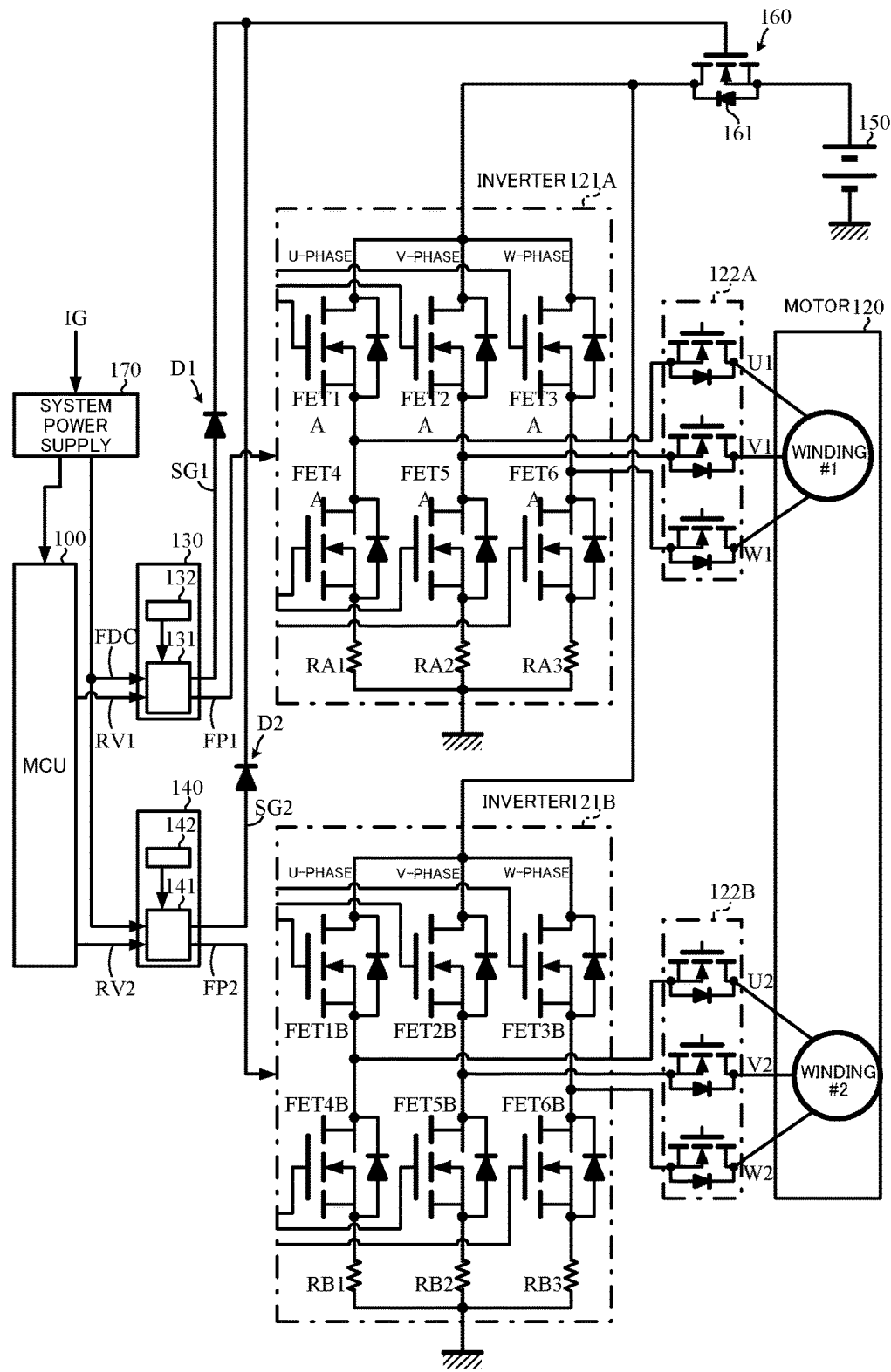
FIG. 9 is a circuit diagram showing the configuration example of the present invention (the second embodiment)
Figure 10:
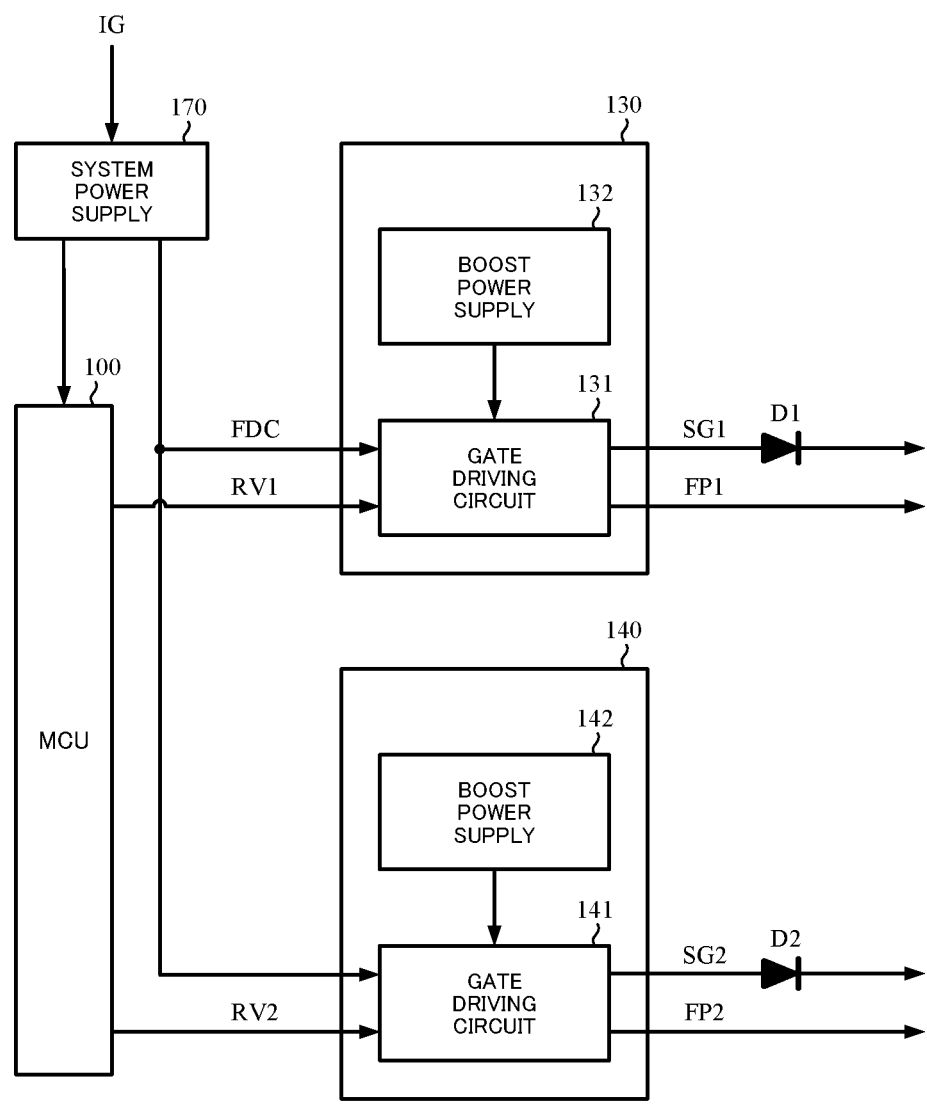
FIG. 10 is a block diagram showing the configuration example of the gate driving section (the second embodiment)

In the above first embodiment, as shown in FIG. 7 and FIG. 8, the reverse-connection protection-FET driving command FDC is outputted from the MCU 100. However, as shown in FIG. 9 and FIG. 10, the reverse-connection protection-FET driving command FDC may be outputted from the system power supply 170 (the second embodiment).

In the above first embodiment and second embodiment, the reverse-connection protection-FET driving command FDC is one system. However, instead of the above configuration, the dual-system reverse-connection protection-FET driving commands FDCA and FDCB are generated from the MCU 100 or the system power supply 170, and a configuration that is shown in FIG. 11 and FIG. 12, or FIG. 13 and FIG. 14 can be used (the third embodiment and the fourth embodiment).

Figure 11:
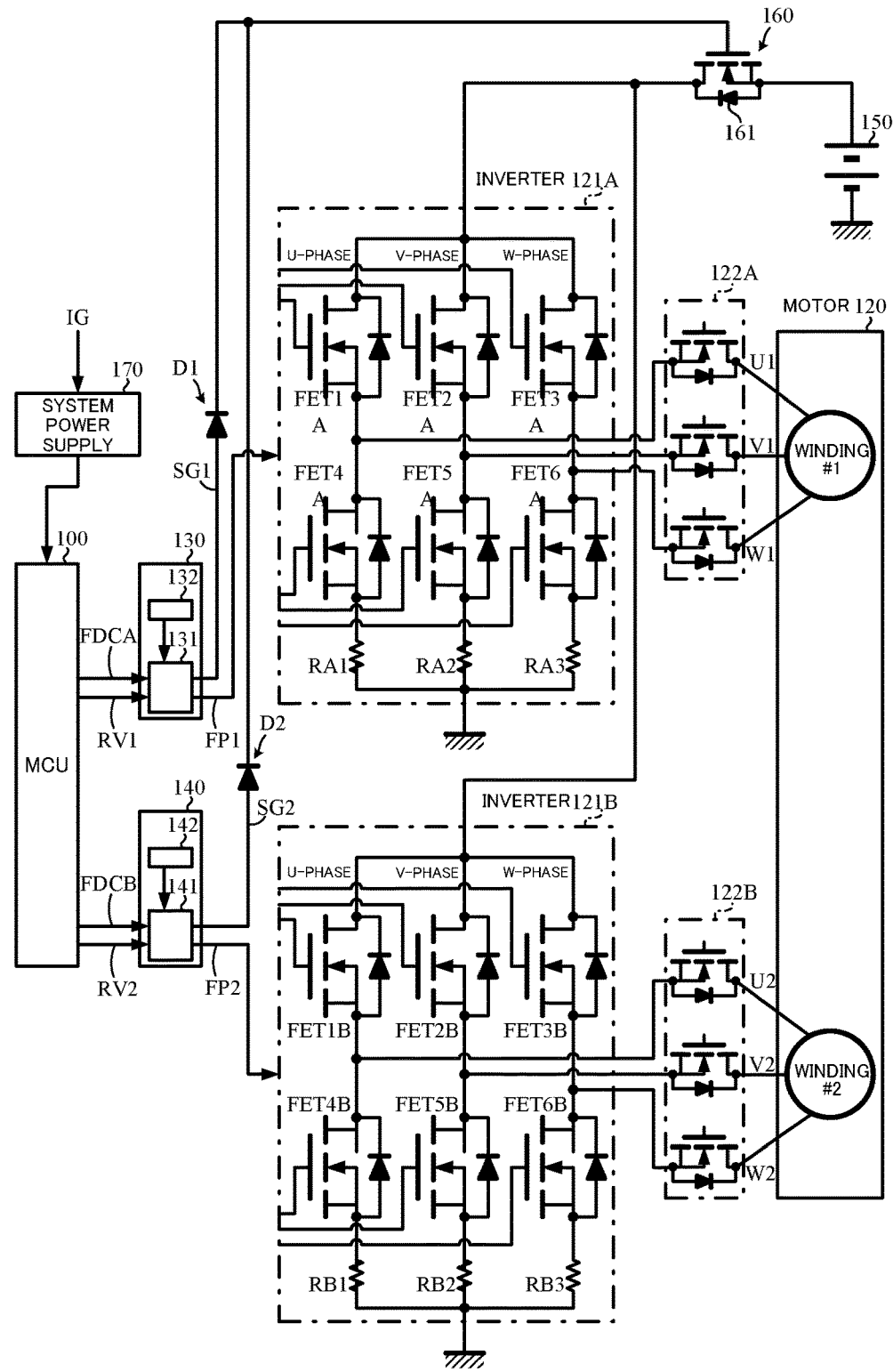
FIG. 11 is a circuit diagram showing the configuration example of the present invention (the third embodiment)
Figure 12:
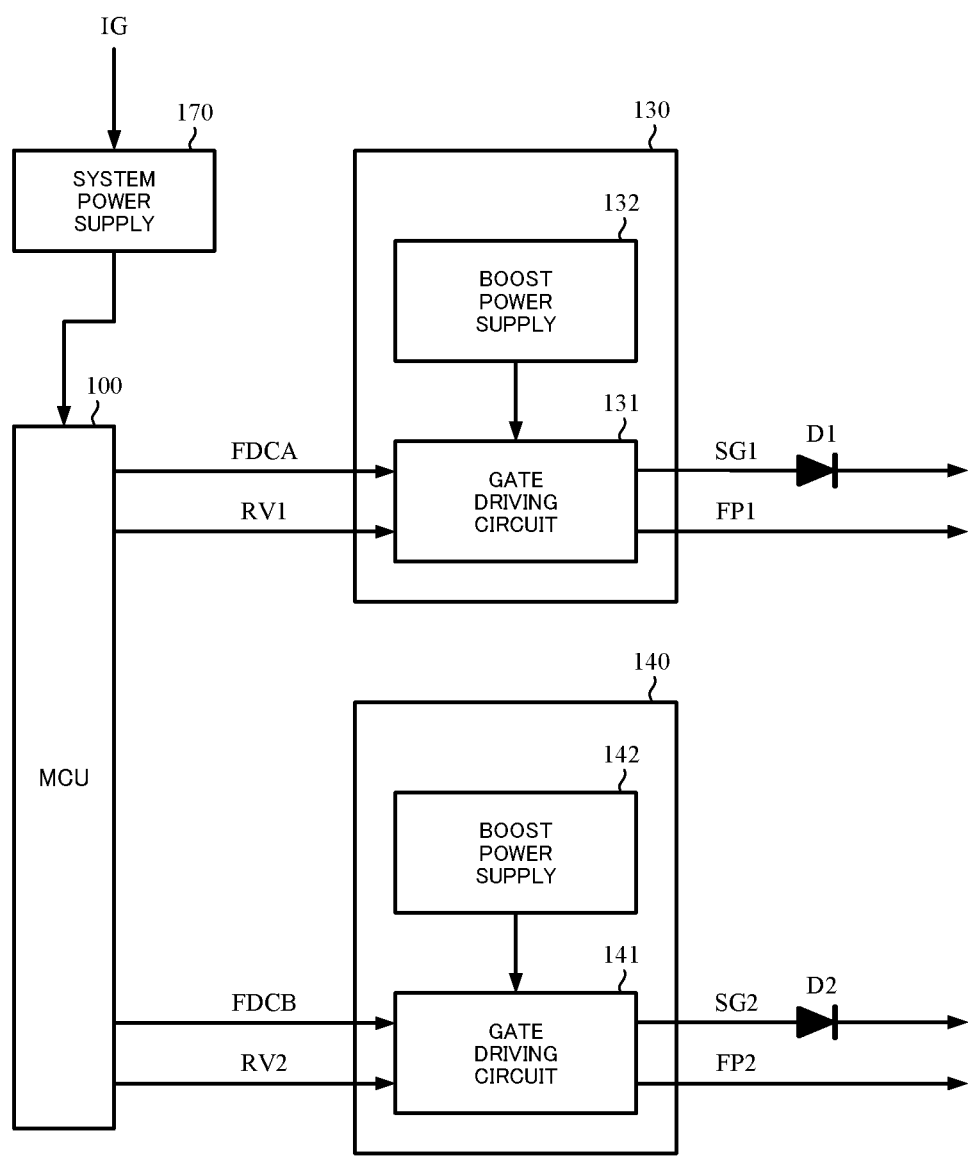
FIG. 12 is a block diagram showing the configuration example of the gate driving section (the third embodiment)
Figure 13:
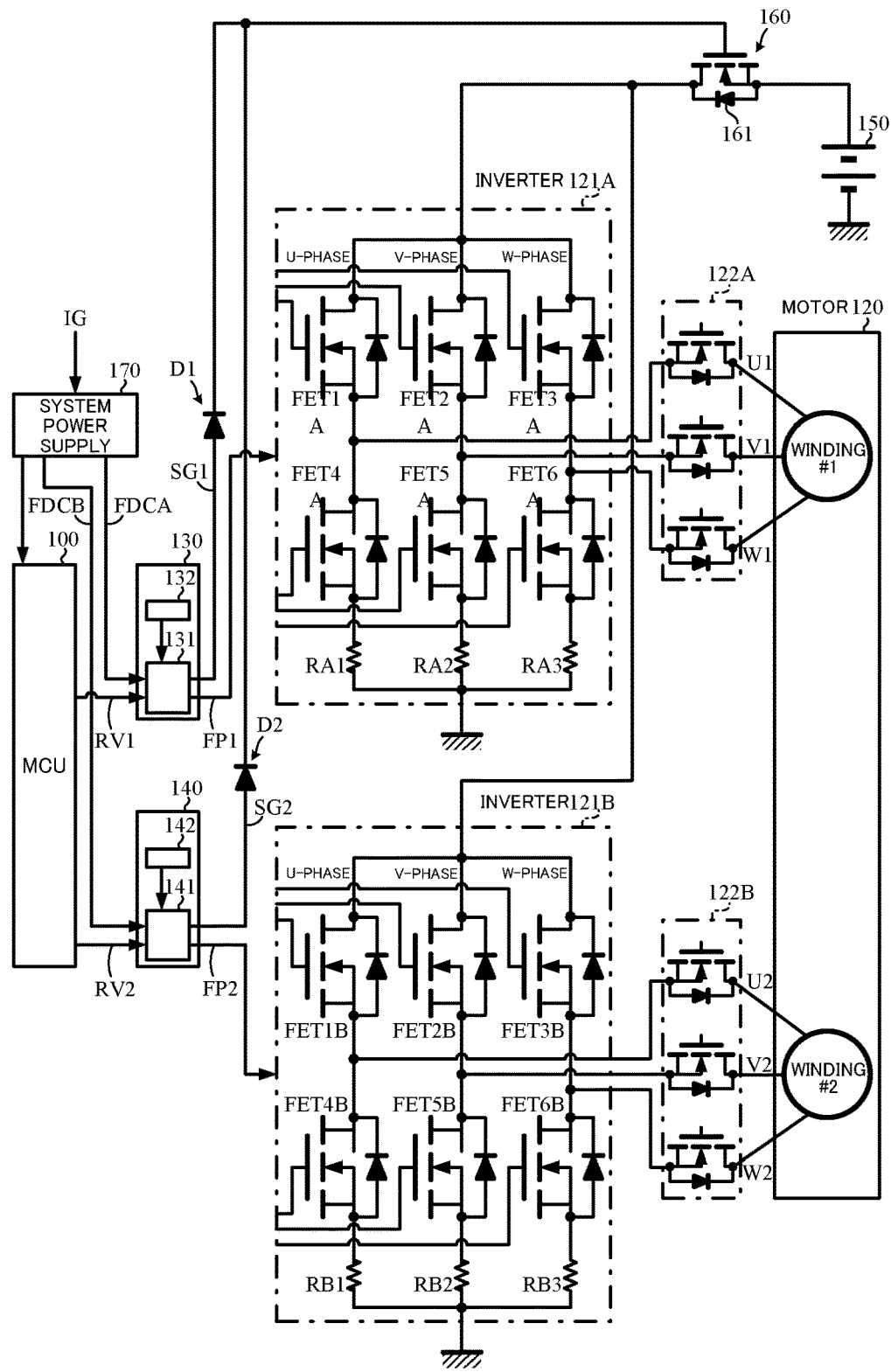
FIG. 13 is a circuit diagram showing the configuration example of the present invention (the fourth embodiment)
Figure 14:
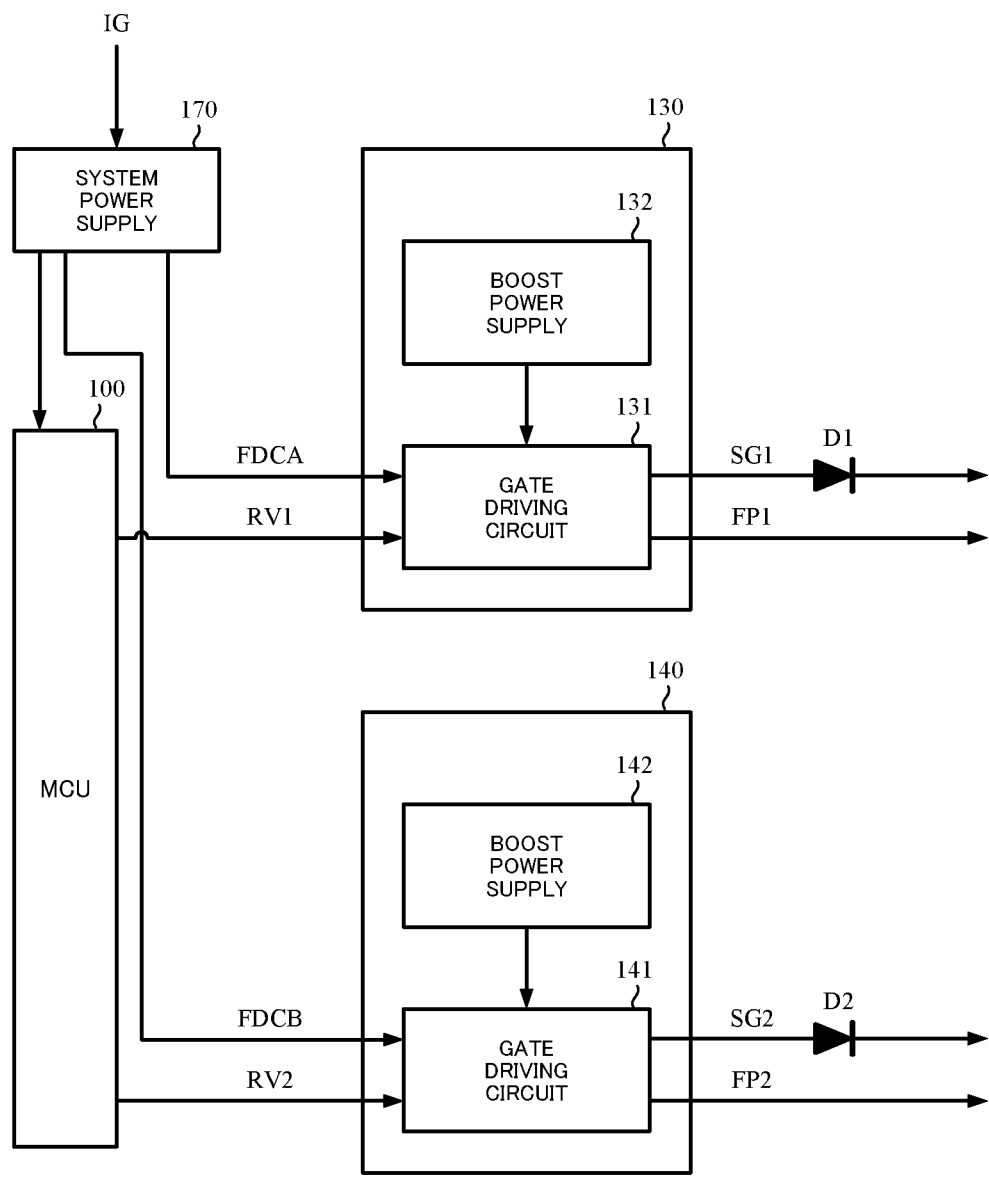
FIG. 14 is a block diagram showing the configuration example of the gate driving section (the fourth embodiment)

That is, in the third embodiment shown in FIG. 11 and FIG. 12, the reverse-connection protection-FET driving command of the first system FDCA that is generated from the MCU 100 is inputted into the gate driving section 130. The reverse-connection protection-FET driving command of the second system FDCB that is generated from the MCU 100 is inputted into the gate driving section 140. The logical sum of the FET driving signals SG1 and SG2 is inputted into the gate of the reverse-connection protection-FET 160. In the fourth embodiment shown in FIG. 13 and FIG. 14, the reverse-connection protection-FET driving command of the first system FDCA that is generated from the system power supply 170 is inputted into the gate driving section 130. The reverse-connection protection-FET driving command of the second system FDCB that is generated from the system power supply 170 is inputted into the gate driving section 140. The logical sum of the FET driving signals SG1 and SG2 is inputted into the gate of the reverse-connection protection-FET 160. In normal operating, the dual-system reverse-connection protection-FET driving commands FDCA and FDCB are turned-ON or turned-OFF at the same time, and in the third embodiment and the fourth embodiment, the reverse-connection protection-FET 160 is operated as shown in Table 2.

TABLE 2

| Reverse-connection Protection-FET driving command A (FDCA) | Reverse-connection Protection-FET driving command B (FDCB) | Reverse-connection Protection-FET driving signal 1 (SG1) | Reverse-connection Protection-FET driving signal 2 (SG2) | Reverse-connection Protection-FET 160 |
|---|---|---|---|---|
| L (Normal) | L (Normal) | L (Normal) | L (Normal) | OFF |
| H (Normal) | H (Normal) | H (Normal) | H (Normal) | ON |
| H (Normal) | L (Abnormal) | H (Normal) | L (Normal) | ON |
| L (Abnormal) | H (Normal) | L (Normal) | H (Normal) | ON |
| H (Normal) | H (Normal) | L (Abnormal) | H (Normal) | ON |
| H (Normal) | H (Normal) | H (Normal) | L (Abnormal) | ON |
| H (Normal) | H (Normal) | H (Normal) | H (Normal) | ON |
| H (Normal) | H (Normal) | L (Abnormal) | H (Normal) | ON |
| H (Normal) | H (Normal) | H (Normal) | L (Abnormal) | ON |

In the first embodiment and the second embodiment, since the reverse-connection protection-FET driving command FDC is one system, in a case that the reverse-connection protection-FET driving command FDC switches "H" to "L" due to the abnormality, the reverse-connection protection-FET 160 is turned-OFF. On the other hand, in the third embodiment and the fourth embodiment, since the reverse-connection protection-FET driving commands FDCA and FDCB are independent dual-systems, even in a case that an output of one system switches "H" to "L", the reverse-connection protection-FET 160 can be turned-ON.

Figure 15:
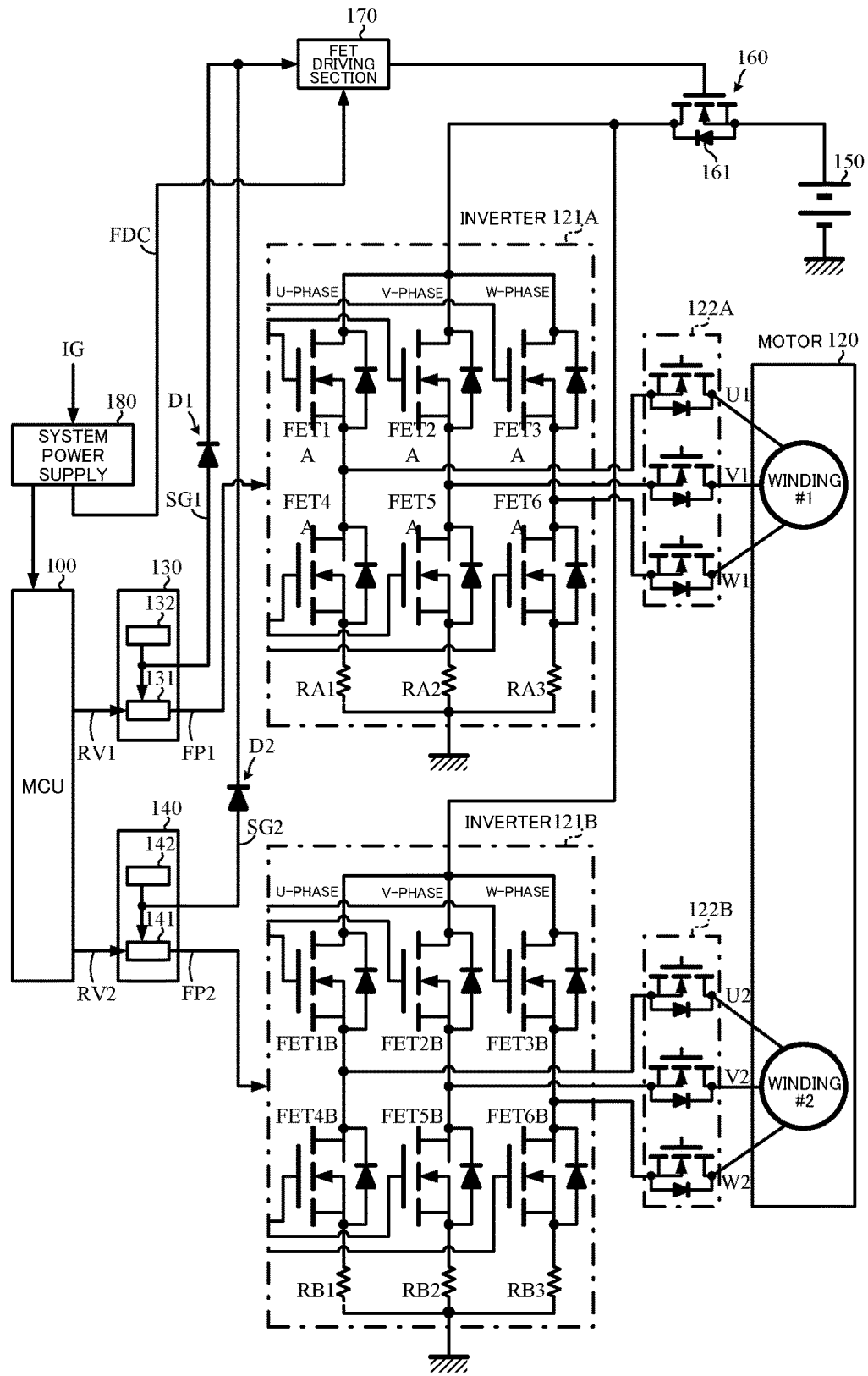
FIG. 15 is a circuit diagram showing the configuration example of the present invention (the fifth embodiment)

FIG. 15 shows the fifth embodiment of the present invention, and the common reverse-connection protection-FET 160 is connected between the dual-system inverters 121A and 121B and the battery 150 that is a power supply. When the reverse-connection protection-FET 160 is turned-OFF, the electric power is supplied from the battery 150 to the inverters 121A and 121B through the parasitic diode 161. The reverse-connection protection-FET 160 is turned-ON or turned-OFF by an FET driving section 170. The reverse-connection protection-FET driving command FDC is inputted from the system power supply 180 to the FET driving section 170. The respective gate driving voltages SG1 and SG2 (for example, the charge pump voltages) from the dual-system gate driving section 130 and 140 passes through diodes D1 and D2, performs a wired OR (a logical sum). The above signal is inputted into the FET driving section 170. The FET driving section 170 is constituted by a semiconductor device such as a transistor.

Figure 16:
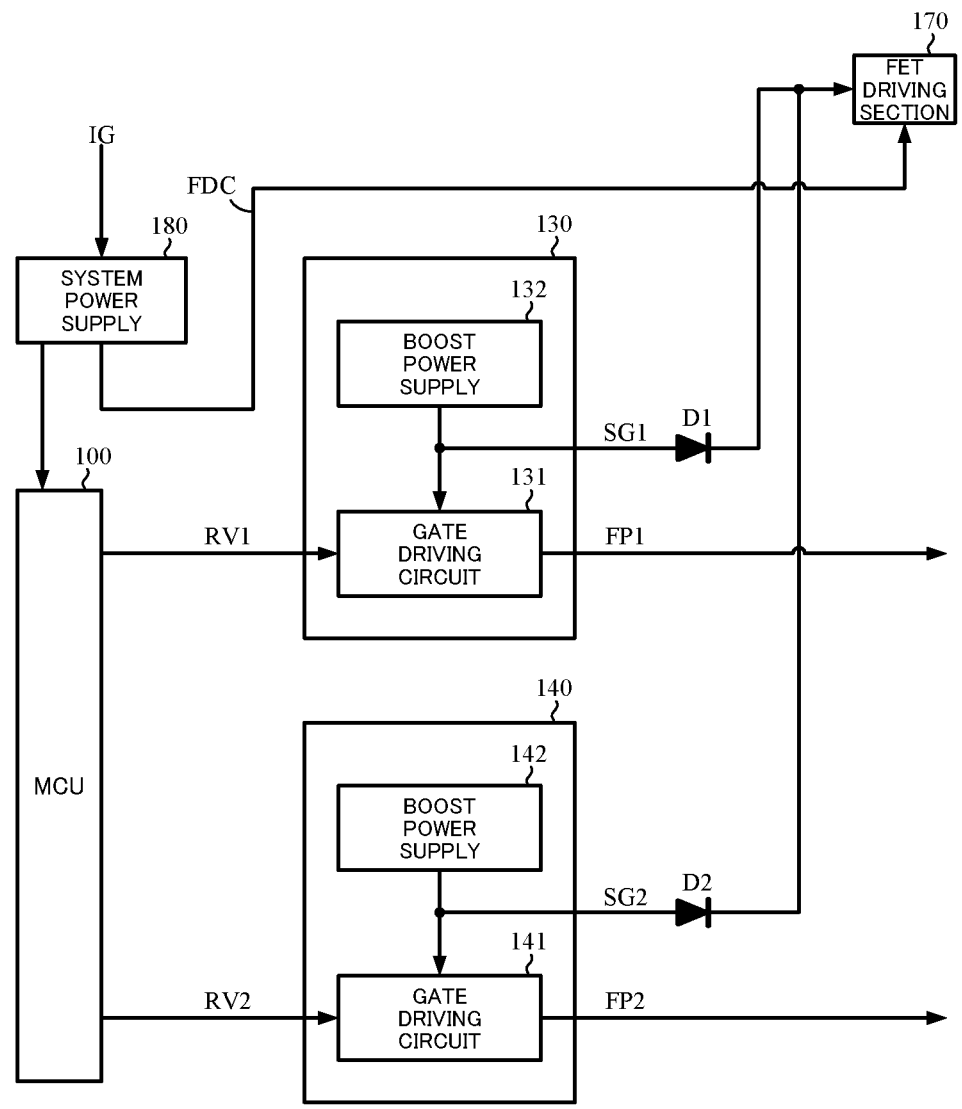
FIG. 16 is a block diagram showing the configuration example of the gate driving section.

The configuration of the gate driving sections 130 and 140 is shown in, for example, FIG. 16. The gate driving sections 130 and 140 comprise the gate driving circuits 131 and 141 that the FETs of the inverters 121A and 121B are driven turning-ON or turning-OFF by the duty command values RV1 and RV2 from the MCU 100, and the boost power supplies 132 and 142 that supply the gate voltages to the gate voltages to the gate driving circuits 131 and 141 and output the gate driving voltages SG1 and SG2, respectively. The boost power supplies 132 and 142 are constituted by the step-up converter or the charge pump.

In such a configuration, the reverse-connection protection-FET 160 is turned-ON or is turned-OFF by the FET driving section 170. The reverse-connection protection-FET driving command FDC from the system power supply 180 and the logical sum of the gate driving voltages SG1 and SG2 from the dual-system gate driving sections 130 and 140 are inputted into the FET driving section 170. The reverse-connection protection-FET 160 is operated as shown in a below Table 3.

TABLE 3

| Reverse-connection Protection-FET driving command (FDC) | gate driving voltage 1 (SG1) | gate driving voltage 2 (SG2) | Reverse-connection Protection-FET 160 |
|---|---|---|---|
| L (Normal) | L (Normal) | L (Normal) | OFF |
| H (Normal) | H (Normal) | H (Normal) | ON |
| H (Normal) | L (Abnormal) | H (Normal) | ON |
| H (Normal) | H (Normal) | L (Abnormal) | ON |

When the inverters 121A and 121B are operated and the dual-system winding motor 120 is energized, the current is passed through the parasitic diode 161 of the reverse-connection protection-FET 160. In a case that the reverse-connection protection-FET is turned-OFF, since the current is passed through the parasitic diode 161 within the reverse-connection protection-FET 160, the loss of the reverse-connection protection-FET 160 is large, and the failure can be occurred by heat generation. Consequently, when the inverters 121A and 121B are operated, the reverse-connection protection-FET 160 is turned-ON before starting to operate the inverters and the loss decreases. In this case, the reverse-connection protection-FET driving command FDC from the system power supply 180 that is set to "H" is outputted.

In driving-operating the dual-system inverters 121A and 121B, even in a case that one system of the FET driving systems is abnormal and the driving signals SG1 and SG2 cannot be outputted, the inverters 121A and 121B can be operated in a state that the reverse-connection protection-FET 160 is turned-ON by using the driving voltage from the other system of the FET driving systems.

By using the above configuration, even in a case that one system of the FET driving systems is abnormal and the FET driving voltage cannot be outputted, since the logical sum of the gate driving voltages SG1 and SG2 is inputted into the FET driving section 170, the reverse-connection protection-FET 160 can be driven by the gate driving voltage from the other system of the FET driving systems. Thereby, in a case that one system of the FET driving systems is abnormal and the motor 120 is driven by the FET driving system and the inverter of the other system, the reverse-connection protection-FET 160 can maintain the turned-ON and the loss of the reverse-connection protection-FET 160 can decrease.

Figure 17:
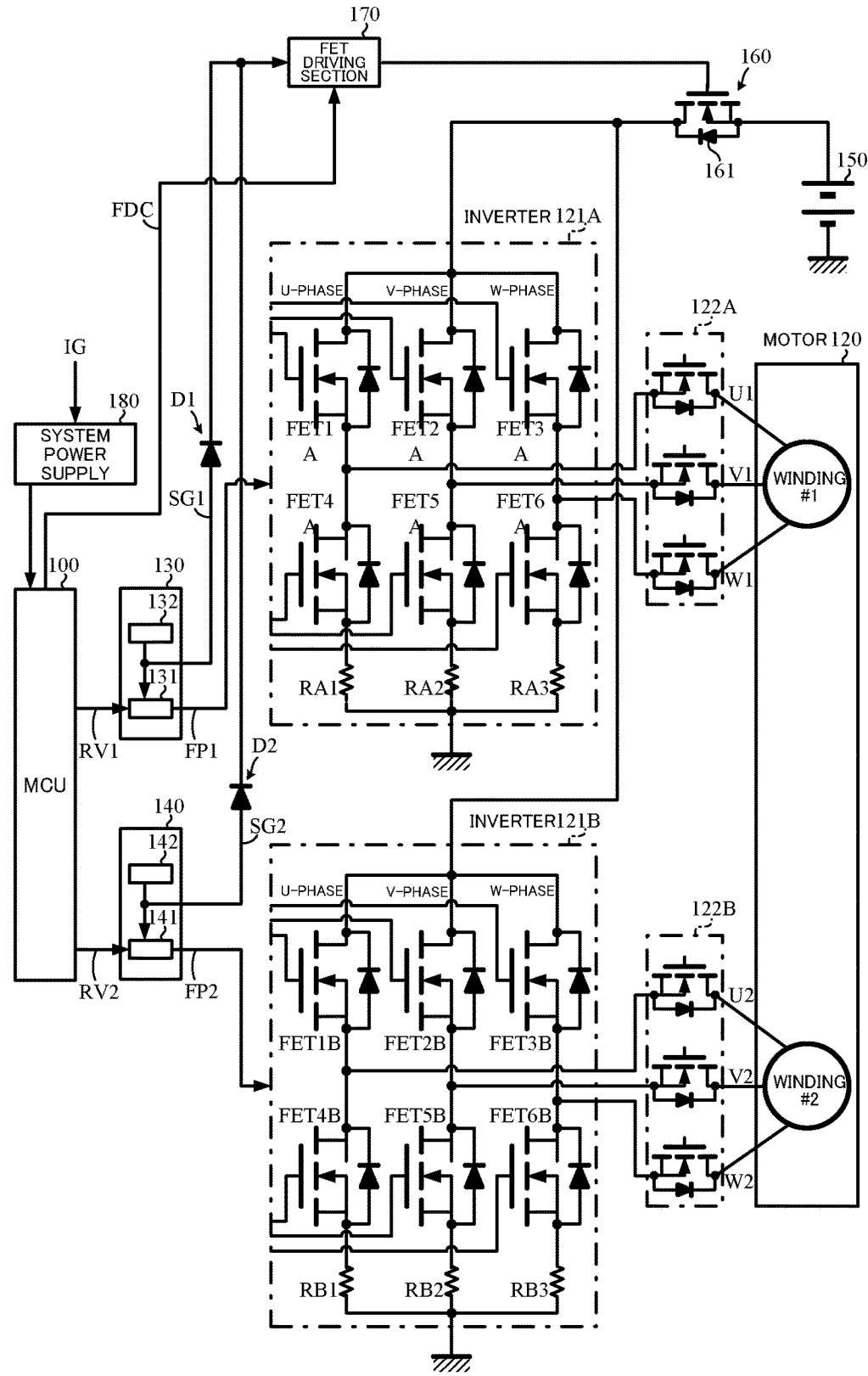
FIG. 17 is a circuit diagram showing the configuration example of the present invention (the sixth embodiment)
Figure 18:
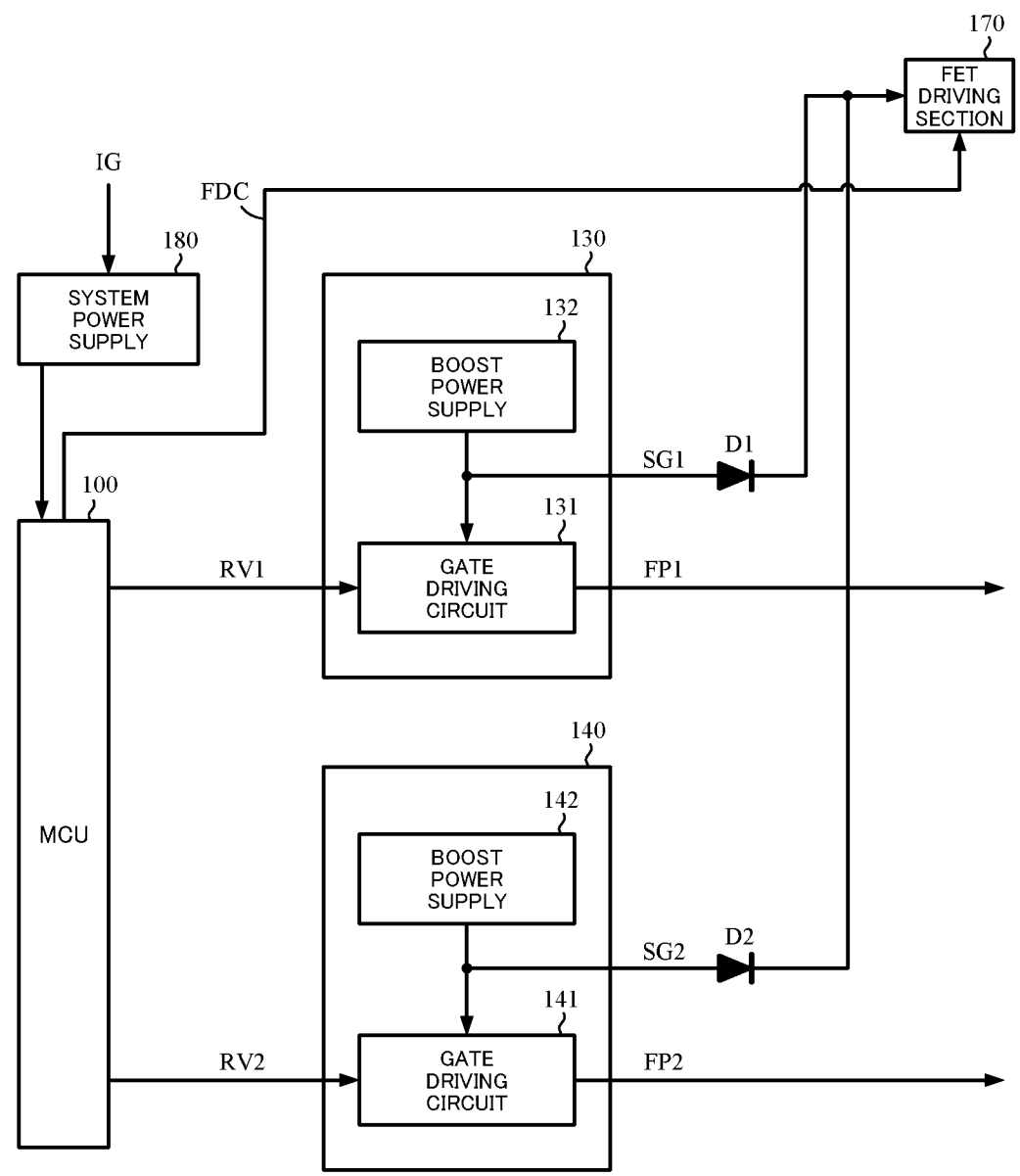
FIG. 18 is a block diagram showing the configuration example of the gate driving section.

FIG. 17 and FIG. 18 show the sixth embodiment of the present invention corresponding to FIG. 15 and FIG. 16. In the sixth embodiment, the reverse-connection protection-FET driving command FDC that is outputted from the MCU 100 is inputted into the FET driving section 170.

Figure 19:
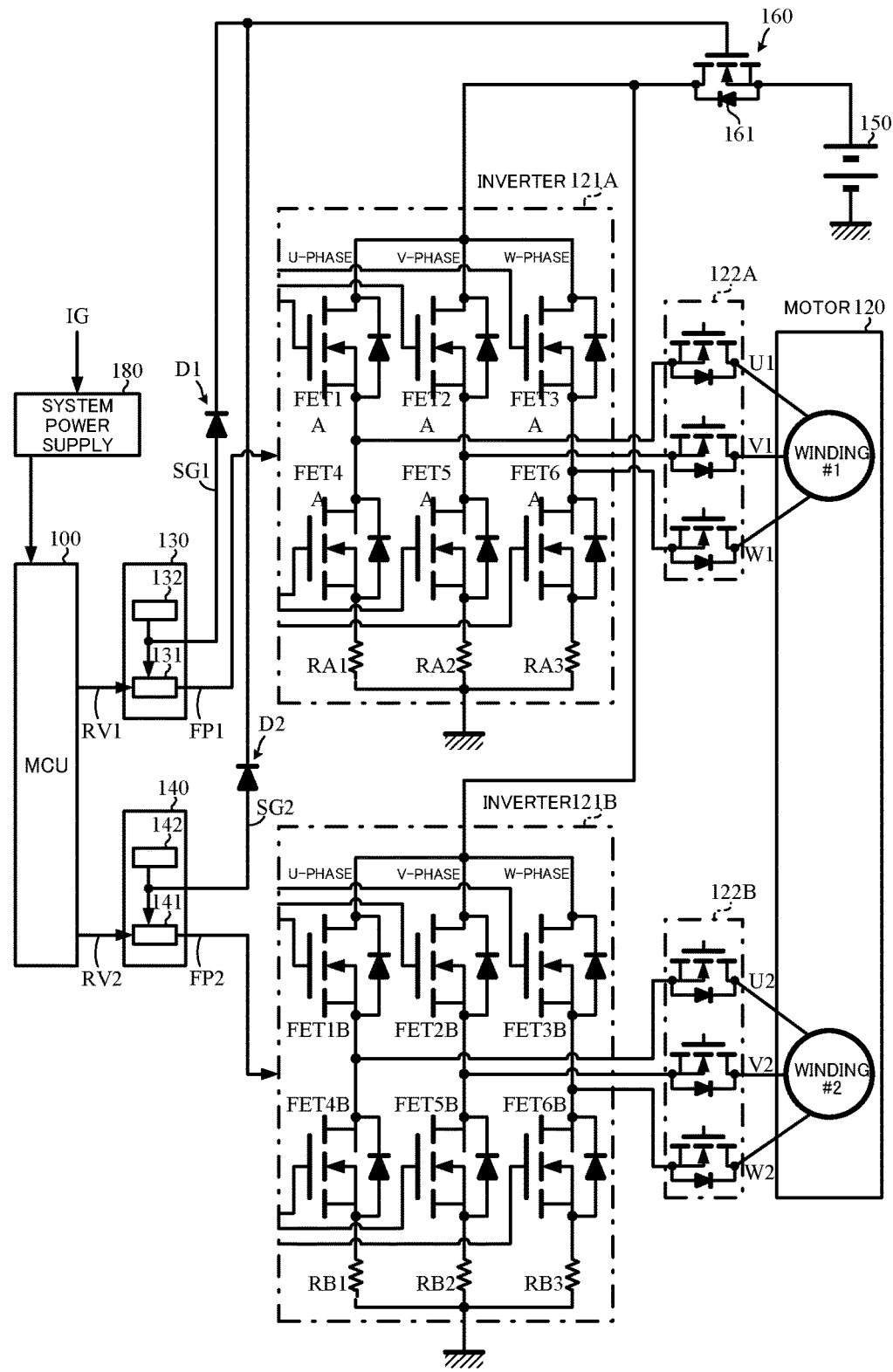
FIG. 19 is a circuit diagram showing the configuration example of the present invention (the seventh embodiment)

In the above fifth embodiment shown in FIG. 15 and FIG. 16 and the sixth embodiment shown in FIG. 17 and FIG. 18, the reverse-connection protection-FET 160 is driven based on the reverse-connection protection-FET driving command FDC through the FET driving section 170. The system power supply 180 or the MCU 100 does not generate the reverse-connection protection-FET driving command FDC, and the configuration shown in FIG. 19 can be used (the seventh embodiment). That is, in the seventh embodiment shown in FIG. 19, the FET driving section is removed, and only the logical sum of the gate driving voltages SG1 and SG2 is inputted into the gate of the reverse-connection protection-FET 160. When the gate driving voltages SG1 and SG2 are generated, the reverse-connection protection-FET 160 is turned-ON by the logical sum of the gate driving voltages SG1 and SG2. When the dual-system FET driving systems are deactivated and the gate driving voltages are turned-OFF, the reverse-connection protection-FET 160 is turned-OFF. In this case, the FET driving system is activated or is deactivated, and then the reverse-connection protection-FET 160 is turned-ON or turned-OFF.

Figure 20:
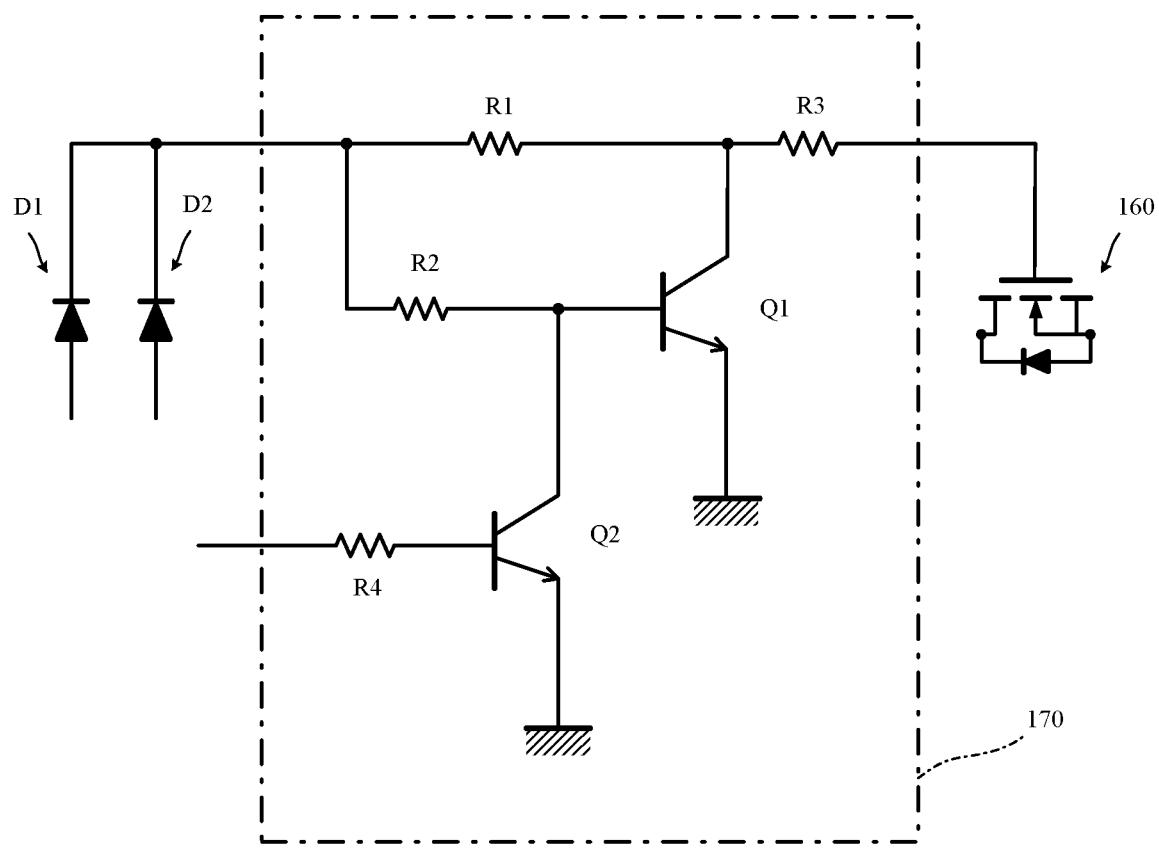
FIG. 20 is a circuit diagram showing a circuit example of an FET driving section.

As well, all FETs of the FET1A to the FET6A, the FET1B to the FET6B, the U1 to the W1, the U2 to the W2 and the reverse-connection protection-FET 160 are an N-channel metal-oxide-semiconductor field-effect transistor (MOS-FET). The FET driving section 170, for example as shown in FIG. 20, can be constituted by an analog switch that uses the transistors Q1 and Q2.

All FETs of the FET1A to the FET6A, the FET1B to the FET6B, the U1 to the W1, the U2 to the W2 and the reverse-connection protection-FET 160 are an N-channel MOS-FET.

EXPLANATION OF REFERENCE NUMERALS 1 handle
2 column shaft (steering shaft, handle shaft)
10 torque sensor
12 vehicle speed sensor
13, 150 battery
20, 120 motor
23, 122A, 122B motor release switch
30 control unit (ECU)
31 current command value calculating section
37, 121A, 121B inverter
100 MCU
130, 140 gate driving section
160 reverse-connection protection-FET
161 parasitic diode
170, 180 system power supply

The invention claimed is:

1. A motor control unit, comprising:
a micro controller unit (MCU) to control a motor having dual-system motor windings,
dual-system inverters to drive said respective dual-system motor windings via dual-system gate driving sections, and
one reverse-connection protection-field-effect transistor (FET) that is connected between said dual-system inverters and a power supply,
wherein said reverse-connection protection-FET is turned-ON or turned-OFF by a logical sum of gate driving signals from said dual-system gate driving sections.

2. The motor control unit according to claim 1, wherein said respective dual-system gate driving sections comprise:
a gate driving circuit to output a gate driving signal for driving inverter-FETs of each system in said dual-system inverter FETs and said reverse-connection protection-FET, and
a boost power supply to supply a voltage to said gate driving circuit.

3. The motor control unit according to claim 1, wherein a reverse-connection protection-FET driving command is inputted into said dual-system gate driving sections, and said dual-system gate driving sections output said gate driving signals based on said reverse-connection protection-FET driving command.

4. The motor control unit according to claim 2, wherein a reverse-connection protection-FET driving command is inputted into said dual-system gate driving sections, and said dual-system gate driving sections output said gate driving signals based on said reverse-connection protection-FET driving command.

5. The motor control unit according to claim 3, wherein said reverse-connection protection-FET driving command is inputted from a system power supply into said dual-system gate driving sections, and said dual-system gate driving sections output said gate driving signals based on said reverse-connection protection-FET driving command.

6. The motor control unit according to claim 3, wherein said reverse-connection protection-FET driving command is inputted from said MCU into said dual-system gate driving sections, and said dual-system gate driving sections output said gate driving signals based on said reverse-connection protection-FET driving command.

7. The motor control unit according to claim 3, wherein first and second reverse-connection protection-FET driving commands are inputted from a system power supply into said dual-system gate driving sections, and said dual-system gate driving sections output said gate driving signals based on said first and second reverse-connection protection-FET driving commands, respectively.

8. The motor control unit according to claim 3, wherein first and second reverse-connection protection-FET driving commands are inputted from said MCU into said dual-system gate driving sections, and said dual-system gate driving sections output said gate driving signals based on said first and second reverse-connection protection-FET driving commands, respectively.

9. An electric power steering apparatus that is equipped with the motor control unit according to claim 1, driving-controls the motor by a current command value calculated based on at least a steering torque, and applies an assist torque to a steering system of a vehicle.

10. A vehicle that is equipped with the electric power steering apparatus according to claim 9.

11. A motor control unit, comprising:
a micro controller unit (MCU) to control a motor having dual-system motor windings,
dual-system inverters to drive said respective dual-system motor windings via dual-system driving sections, and
one reverse-connection protection-field-effect transistor (FET) that is connected between said dual-system inverters and a power supply, and supplies electric power,
wherein said reverse-connection protection-FET is turned-ON or turned-OFF by a logical sum of gate driving voltages from said dual-system gate driving sections.

12. The motor control unit according to claim 11, wherein said respective dual-system gate driving sections comprise:
a gate driving circuit to drive an inverter of each system in said dual-system inverters, and
a boost power supply to supply a voltage to said gate driving circuit and output said gate driving voltage of each system.

13. The motor control unit according to claim 11, wherein, in a case that a reverse-connection protection-FET driving command is normal, said reverse-connection protection-FET continues turned-ON by said logical sum even when one of said gate driving voltages is abnormal.

14. The motor control unit according to claim 12, wherein, in a case that a reverse-connection protection-FET driving command is normal, said reverse-connection protection-FET continues turned-ON by said logical sum even when one of said gate driving voltages is abnormal.

15. The motor control unit according to claim 11, wherein an FET driving section that inputs said reverse-connection protection-FET driving command and said logical sum, and turns-ON or turns-OFF said reverse-connection protection-FET, is provided.

16. An electric power steering apparatus that is equipped with the motor control unit according to claim 11, driving-controls the motor by a current command value calculated based on at least a steering torque, and applies an assist torque to a steering system of a vehicle.

17. A vehicle that is equipped with the electric power steering apparatus according to claim 16.

* * * * *